US012761865B2

(12) United States Patent
Han et al.

(10) Patent No.: US 12,761,865 B2
(45) Date of Patent: Oct. 13, 2026

(54) SOUND OUTPUT DEVICE FOR OBTAINING SOUND SETTING INFORMATION USING SPACE INFORMATION AND CONTROLLING METHOD THEREOF

(71) Applicant: SAMSUNG ELECTRONICS CO., LTD., Suwon-si (KR)

(72) Inventors: Manchul Han, Suwon-si (KR); Byungyong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 245 days.

(21) Appl. No.: 18/745,547

(22) Filed: Jun. 17, 2024

(65) Prior Publication Data

US 2024/0394013 A1 Nov. 28, 2024

Related U.S. Application Data

(63) Continuation of application No. PCT/KR2024/006852, filed on May 21, 2024.

(30) Foreign Application Priority Data

May 22, 2023 (KR) ........................ 10-2023-0065498

(51) Int. Cl.
*G06F 3/16* (2006.01)
*H04R 29/00* (2006.01)

(52) U.S. Cl.
CPC ........... *G06F 3/165* (2013.01); *H04R 29/001* (2013.01)

(58) Field of Classification Search
CPC ......... G06F 3/165; H04R 29/001; H04R 3/12; H04R 2499/15; H04S 7/301; G06N 3/02
See application file for complete search history.

(56) References Cited

U.S. PATENT DOCUMENTS 5,910,990 A * 6/1999 Jang ........................ H04S 7/301 381/103
9,515,629 B2 * 12/2016 Goldstein ............. H03G 5/165
(Continued)

FOREIGN PATENT DOCUMENTS

CN 112995551 A 6/2021
EP 3 873 113 A1 9/2021
(Continued)

OTHER PUBLICATIONS

International Search Report (PCT/ISA/210) issued on Aug. 27, 2024 by the International Searching Authority in International Application No. PCT/KR2024/006852.
(Continued)

*Primary Examiner* — Akelaw Teshale
(74) *Attorney, Agent, or Firm* — Sughrue Mion, PLLC

(57) ABSTRACT

A sound output device is provided. The sound output device includes a memory configured to store first device information of the sound output device, a communication interface including circuitry, a speaker, and one or more processors configured to, based on user identification information being received, receive perceived sound information corresponding to the user identification information from a server through the communication interface, control the speaker to output sound, based on a signal corresponding to the sound being received from a remote control device receiving the sound, obtain sound setting information corresponding to the sound output device by inputting the first device information, the received signal and the perceived sound information to a neural network model, and set the sound output device according to the sound setting information.

20 Claims, 12 Drawing Sheets

<Space 1>

<Space 2>

(56) References Cited

U.S. PATENT DOCUMENTS

| | | | | |
|---|---|---|---|---|
| 9,781,531 | B2 * | 10/2017 | Sun | H04R 29/006 |
| 9,781,532 | B2 * | 10/2017 | Sheen | H04R 29/007 |
| 9,910,634 | B2 * | 3/2018 | Sheen | H04R 29/001 |
| 10,283,142 | B1 * | 5/2019 | Yu | G10L 25/30 |
| 10,299,052 | B2 | 5/2019 | Lee et al. | |
| 10,349,171 | B2 | 7/2019 | Yoon et al. | |
| 10,515,398 | B2 | 12/2019 | Kosseifi et al. | |
| 10,803,881 | B1 | 10/2020 | Fazeli et al. | |
| 11,003,414 | B2 | 5/2021 | Choi et al. | |
| 11,089,405 | B2 | 8/2021 | Jarvinen et al. | |
| 11,350,233 | B2 * | 5/2022 | Sheen | G06F 3/165 |
| 11,374,547 | B2 * | 6/2022 | McPherson | G06F 3/165 |
| 11,393,487 | B2 | 7/2022 | Fazeli et al. | |
| 11,521,634 | B2 | 12/2022 | Fazeli et al. | |
| 11,564,050 | B2 | 1/2023 | Hwang et al. | |
| 12,073,847 | B2 | 8/2024 | Fazeli et al. | |
| 2017/0185373 | A1 | 6/2017 | Kim et al. | |
| 2018/0091898 | A1 | 3/2018 | Yoon et al. | |
| 2019/0037311 | A1 | 1/2019 | Garner et al. | |
| 2020/0133622 | A1 * | 4/2020 | Coover | H04N 21/44224 |
| 2020/0312345 | A1 | 10/2020 | Fazeli et al. | |
| 2020/0312346 | A1 | 10/2020 | Fazeli et al. | |
| 2020/0411030 | A1 | 12/2020 | Fazeli et al. | |
| 2021/0176580 | A1 | 6/2021 | Hwang et al. | |
| 2022/0038837 | A1 | 2/2022 | Del Sordo et al. | |
| 2022/0293120 | A1 | 9/2022 | Fazeli et al. | |
| 2023/0079741 | A1 * | 3/2023 | Snook | H04R 1/403 381/59 |
| 2023/0102049 | A1 | 3/2023 | Oh | |
| 2023/0146772 | A1 * | 5/2023 | Snook | H04R 29/007 381/303 |
| 2023/0388705 | A1 * | 11/2023 | Tinklenberg | H04R 29/001 |
| 2024/0107248 | A1 * | 3/2024 | Lau | H04R 5/033 |

FOREIGN PATENT DOCUMENTS

| | | | |
|---|---|---|---|
| JP | 2014-86847 | A | 5/2014 |
| KR | 0185021 | B1 | 4/1999 |
| KR | 10-2016-0031768 | A | 3/2016 |
| KR | 10-2016-0144919 | A | 12/2016 |
| KR | 10-2017-0076357 | A | 7/2017 |
| KR | 10-2019-0106916 | A | 9/2019 |
| KR | 10-2020-0115107 | A | 10/2020 |
| KR | 10-2021-0072388 | A | 6/2021 |
| KR | 10-2390189 | B1 | 4/2022 |
| KR | 10-2477001 | B1 | 12/2022 |

OTHER PUBLICATIONS

Written Opinion (PCT/ISA/237) issued on Aug. 27, 2024 by the International Searching Authority in International Application No. PCT/KR2024/006852.

"dSONIQ Measurements", dSONIQ Headphone Frequency Response Database, retrieved on Feb. 8, 2023, 7 pages, https://www.dsoniq.com/headphone_frequency_response_database.

"Maximize your creative possibilities", Avid Complete Plugin Bundle for Pro Tool—Audio Plugin—Avid, retrieved on Feb. 8, 2023, 9 pages, https://www.avid.com/plugins/avid-complete-plugin-bundle.

Communication dated Apr. 15, 2026 issued by the European Patent Office in European Patent Application No. 24811381.3.

* cited by examiner

SOUND OUTPUT DEVICE FOR OBTAINING SOUND SETTING INFORMATION USING SPACE INFORMATION AND CONTROLLING METHOD THEREOF

CROSS-REFERENCE TO RELATED APPLICATIONS

This application is a bypass continuation of International Application No. PCT/KR2024/006852, filed on May 21, 2024, which is based on and claims priority to Korean Patent Application No. 10-2023-0065498, filed on May 22, 2023, in the Korean Intellectual Property Office, the disclosures of which are incorporated by reference herein in their entireties.

BACKGROUND

1. Field

The present disclosure relates to a sound output device and a method of controlling same. More specifically, the disclosure relates to a sound output device that obtains sound setting information using space information and a method of controlling same.

2. Description of Related Art

Recently, various home appliances have been developed and popularized, and in particular, the development and popularization of display devices and sound output devices are more active than any other field.

Consumers customize sound output devices with various features in accordance with their tastes or change them to produce sound quality optimized for their environment (e.g., space).

In addition, with the development of AI-related technology, algorithms to automatically set or adjust various features of sound output devices have been provided.

However, such technology is typically applicable only when setting up a single device, and there is a limitation in that settings customized with reference to the settings of other devices cannot be provided when settings are shared between multiple devices or the user's environment (e.g., space) is changed.

There have been various demands for a method for automatically changing settings for multiple devices to reflect the user's tastes without the user having to change the settings one by one even when the user's environment is changed.

SUMMARY

According to an aspect of the disclosure, a sound output device includes: at least one memory storing one or more instructions and first device information of the sound output device; a communication interface including circuitry; a speaker; and one or more processors configured to: based on receiving user identification information, receive perceived sound information corresponding to the user identification information from a server through the communication interface; control the speaker to output a first sound; based on receiving a signal corresponding to the first sound from a remote control device, obtain sound setting information corresponding to the sound output device by inputting into a neural network model the first device information, the signal corresponding to the first sound, and the perceived sound information; set the sound output device according to the sound setting information; and control the speaker to output a second sound after the sound output device is set according to the sound setting information, wherein the sound setting information is an output of the neural network model, and wherein a signal corresponding to the second sound received from the remote control device includes perceived characteristics which correspond to perceived characteristics according to the perceived sound information.

The one or more processors are configured to: obtain, based on the signal corresponding to the first sound, first space information including at least one of size information of a space where the sound output device is located or shape information of the space, and obtain the sound setting information by inputting, into the neural network model, the first device information, the first space information, the signal corresponding to the first sound, and the perceived sound information, and the perceived characteristics of the first space information may correspond to perceived characteristics of the signal corresponding to the first sound.

The perceived sound information may include second device information, second space information of a space where an external device corresponding to the second device information is located, and perceived characteristics corresponding to the second space information of a sound output from the external device, and the one or more processors are configured to: obtain, based on the signal corresponding to the first sound, first space information including at least one of size information of a space where the sound output device is located or shape information of the space, and based on the first device information and the second device information being different, obtain the sound setting information by inputting into the neural network model the first device information, the first space information, the signal corresponding to the first sound, and the perceived sound information.

The one or more processors are configured to: based on the first device information and the second device information being the same, compare the first space information with the second space information, and based on the first space information and the second space information being different, obtain the sound setting information by inputting into the neural network model the first device information, the first space information, the signal corresponding to the first sound, and the perceived sound information.

The one or more processors are configured to: obtain, based on the signal corresponding to the first sound, distance information including a distance between the sound output device and the remote control device, based on the distance information being changed, control the speaker to re-output the first sound, and based on a signal corresponding to the re-output first sound being received from the remote control device receiving, re-obtain the sound setting information by inputting into the neural network model the first device information, the signal corresponding to the re-output first sound, and the perceived sound information.

The one or more processors are configured to: based on receiving the user identification information, identify a test sound corresponding to the user identification information, and control the speaker to output the test sound as the first sound.

The one or more processors are configured to: based on a setting of the sound output device being changed in response to a user input, re-output the first sound according to the changed setting; based on receiving a signal corresponding to the re-output first sound from the remote control device, obtain updated perceived sound information corresponding to the user identification information based on the perceived characteristics of the signal corresponding to the re-output first sound; and control the communication interface to transmit the updated perceived sound information to the server.

The one or more processors are configured to: based on receiving, through the communication interface, first space information including size information of a space where the sound output device is located or shape information of the space being received through the communication interface, obtain the sound setting information by inputting the first device information, the first space information, the signal corresponding to the first sound, and the perceived sound information to the neural network model.

The one or more processors are configured to: identify a content type corresponding to the first sound; receive perceived sound information corresponding to the identified content type among perceived sound information for each of a plurality of content types; and obtain the sound setting information by inputting into the neural network model the first device information, the signal corresponding to the first sound, and the perceived sound information corresponding to the identified content type.

The perceived characteristics according to the perceived sound information may include at least one of an intensity of each of a plurality of frequencies, reverberation information of each of the plurality of frequencies, or a perceived sound level.

The sound setting information may include parameter information of at least one of a volume, a sound mode, an equalizer, a woofer level, a reverb effector, a delay effector, or a channel balance for each of a plurality of speakers provided in the sound output device.

According to an aspect of the disclosure, a method of controlling a sound output device includes: based on receiving user identification information, receiving from a server perceived sound information corresponding to the user identification information; outputting a first sound; based on receiving a signal corresponding to the first sound from a remote control device, obtaining sound setting information corresponding to the sound output device by inputting into a neural network model first device information stored in a memory of the sound output device, the signal corresponding to the first sound, and the perceived sound information; setting the sound output device according to the sound setting information, and outputting a second sound after the sound output device is set according to the sound setting information, wherein the sound setting information is an output of the neural network model, and wherein a signal corresponding to the second sound received from the remote control device includes perceived characteristics which correspond to perceived characteristics according to the perceived sound information.

The method may further include: obtaining, based on the signal corresponding to the first sound, first space information including at least one of size information of a space where the sound output device is located or shape information of the space, wherein the obtaining the sound setting information further includes obtaining the sound setting information by inputting into the neural network model the first device information, the first space information, the signal corresponding to the first sound, and the perceived sound information, and wherein perceived characteristics of the first space information correspond to perceived characteristics of the signal corresponding to the first sound.

The method may further include: obtaining, based on the signal corresponding to the first sound, first space information including at least one of size information of a space where the sound output device is located or shape information of the space, wherein the perceived sound information includes second device information, second space information of a space where an external device corresponding to the second device information is located, and perceived characteristics corresponding to the second space information of a sound output from the external device, and wherein the obtaining the sound setting information further includes, based on the first device information and the second device information being different, obtaining the sound setting information by inputting into the neural network model the first device information, the first space information, the signal corresponding to the first sound, and the perceived sound information.

The obtaining the sound setting information may further include: based on the first device information and the second device information being the same, comparing the first space information with the second space information; and based on the first space information and the second space information being different, obtaining the sound setting information by inputting into the neural network model the first device information, the first space information, the signal corresponding to the first sound, and the perceived sound information.

According to an aspect of the disclosure, a sound output system includes: a remote control device including a microphone; and a sound output device including: at least one memory storing one or more instructions and first device information of the sound output device; a communication interface including circuitry; a speaker; and one or more processors configured to execute the one or more instructions, wherein the one or more instructions, when executed by the one or more processors, cause the sound output device to: based on receiving user identification information, receive perceived sound information corresponding to the user identification information from a server through the communication interface; control the speaker to output a first sound; based on receiving a signal corresponding to the first sound from the remote control device, obtain sound setting information corresponding to the sound output device by inputting into a neural network model the first device information, the signal corresponding to the first sound, and the perceived sound information; set the sound output device according to the sound setting information; and control the speaker to output a second sound after the sound output device is set according to the sound setting information, wherein the sound setting information is an output of the neural network model, and wherein a signal corresponding to the second sound received from the remote control device includes perceived characteristics which correspond to perceived characteristics according to the perceived sound information.

The one or more instructions, when executed by the one or more processors, further cause the sound output device to: obtain, based on the signal corresponding to the first sound, first space information including at least one of size information of a space where the sound output device is located or shape information of the space, and obtain the sound setting information by inputting, into the neural network model, the first device information, the first space information, the signal corresponding to the first sound, and the perceived sound information, and wherein perceived characteristics of the first space information correspond to perceived characteristics of the signal corresponding to the first sound.

The perceived sound information includes second device information, second space information of a space where an external device corresponding to the second device information is located, and perceived characteristics corresponding to the second space information of a sound output from the external device, and wherein the one or more instructions, when executed by the one or more processors, further cause the sound output device to: obtain, based on the signal corresponding to the first sound, first space information including at least one of size information of a space where the sound output device is located or shape information of the space, and based on the first device information and the second device information being different, obtain the sound setting information by inputting into the neural network model the first device information, the first space information, the signal corresponding to the first sound, and the perceived sound information.

The one or more instructions, when executed by the one or more processors, may further cause the sound output device to: based on the first device information and the second device information being the same, compare the first space information with the second space information, and based on the first space information and the second space information being different, obtain the sound setting information by inputting into the neural network model the first device information, the first space information, the signal corresponding to the first sound, and the perceived sound information.

The one or more instructions, when executed by the one or more processors, may further cause the sound output device to: obtain, based on the signal corresponding to the first sound, distance information including a distance between the sound output device and the remote control device, based on the distance information being changed, control the speaker to re-output the first sound, and based on a signal corresponding to the re-output first sound being received from the remote control device receiving, re-obtain the sound setting information by inputting into the neural network model the first device information, the signal corresponding to the re-output first sound, and the perceived sound information.

According to an embodiment, a computer-readable recording medium includes a program executing a controlling method of a sound output device according to an embodiment, wherein the controlling method of the sound output device includes: based on receiving user identification information, receiving from a server perceived sound information corresponding to the user identification information; outputting a first sound; based on receiving a signal corresponding to the first sound from a remote control device, obtaining sound setting information corresponding to the sound output device by inputting into a neural network model first device information stored in a memory of the sound output device, the signal corresponding to the first sound, and the perceived sound information; setting the sound output device according to the sound setting information, and outputting a second sound after the sound output device is set according to the sound setting information, wherein the sound setting information is an output of the neural network model, and wherein a signal corresponding to the second sound received from the remote control device includes perceived characteristics which correspond to perceived characteristics according to the perceived sound information.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
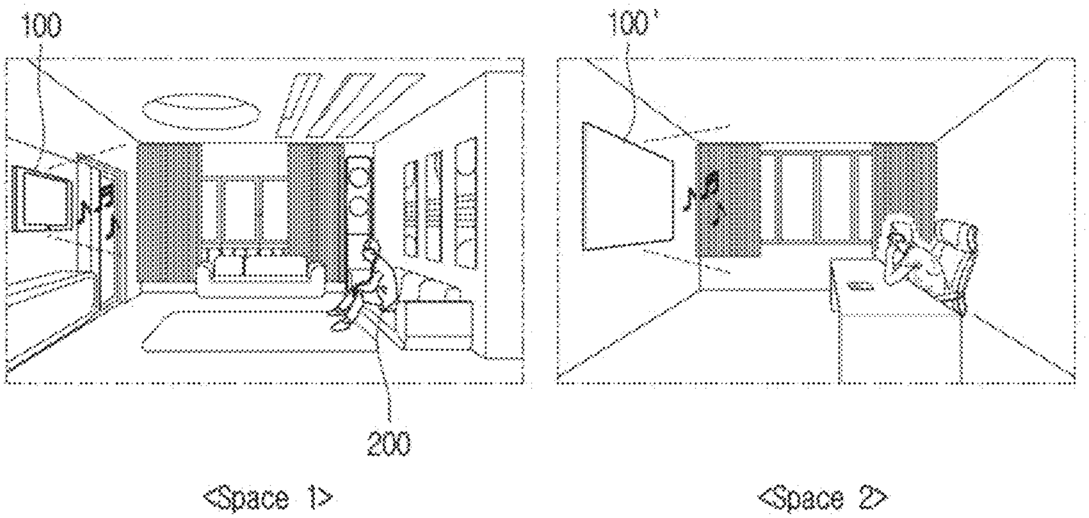
FIG. 1 is a view provided to explain a sound output device that outputs sound in a first space and a sound output device that outputs sound in a second space according to an embodiment.

General terms that are currently widely used are selected as the terms used in describing the embodiments of the disclosure in consideration of their functions in the disclosure, and such terms may be changed based on the intention of those skilled in the art or a judicial precedent, the emergence of a new technique, or the like. In addition, in certain specific cases, terms arbitrarily chosen by an applicant may exist. In these cases, the meanings of such terms are mentioned in detail in corresponding descriptions of the disclosure. Therefore, the terms used in the embodiments of the disclosure should be defined on the basis of the meanings of the terms and the contents throughout the disclosure rather than simple names of the terms.

In the disclosure, an expression "have", "may have", "include", "may include" or the like, indicates the existence of a corresponding feature (for example, a numerical value, a function, an operation or a component such as a part), and does not exclude the existence of an additional feature.

An expression, "at least one of A or/and B" should be understood as indicating any one of "A", "B" and "both of A and B."

Expressions "1st", "2nd", "first", "second", and the like, used in the disclosure may indicate various components regardless of the sequence and/or importance of the components. These expressions are used only to distinguish one component from another component, and do not limit the corresponding components.

In case that any component (for example, a first component) is mentioned to be "(operatively or communicatively) coupled with/to" or "connected to" another component (for example, a second component), it is to be understood that any component is directly coupled to another component or may be coupled to another component through another component (for example, a third component).

A term of a singular number may include its plural number unless explicitly indicated otherwise in the context. It is to be understood that a term "include", "formed of", or the like used in the application specifies the presence of features, numerals, steps, operations, components, parts, or combinations thereof, mentioned in the specification, and does not preclude the presence or addition of one or more other features, numerals, steps, operations, components, parts, or combinations thereof.

In the embodiments, a "module" or a "~er/or" may perform at least one function or operation, and be implemented by hardware or software, or be implemented by a combination of hardware and software. In addition, a plurality of "modules" or a plurality of "~ers/ors" may be integrated in at least one module and implemented by at least one processor except for a "module" or an "~er/or" that needs to be implemented by specific hardware.

In the disclosure, a term "user" may refer to a person using an electronic device or a device using an electronic device (e.g., an artificial intelligence electronic device).

Hereinafter, the present disclosure will be described in greater detail with reference to the accompanying drawings.

FIG. 1 is a view provided to explain a sound output device that outputs sound in a first space and a sound output device that outputs sound in a second space according to an embodiment.

Referring to FIG. 1, a sound output device 100 may be implemented as various types of devices capable of outputting sound, such as a digital television, an audio device, a user terminal device, a sound bar, a home theater system, a room speaker, headphones, earphones, or the like.

For example, the sound output device 100 may be implemented in a form including at least one speaker unit. Here, the speaker unit functions to convert electrical pulses into sound waves, and may be implemented in a dynamic type that is differentiated depending on the principle and method of converting electrical signals into sound waves. However, the speaker unit is not limited thereto, and may be implemented in electrostatic type, dielectric type, magnetostrictive type, etc. within the scope of the present disclosure.

If the sound output device 100 includes a plurality of speaker units, the plurality of speaker units may be responsible for a plurality of channels, respectively, such as 2 channel, 2.1 channel, 3 channel, 3.1 channel, 5.1 channel, 7.1 channel, and the like, and playing the same. For example, the plurality of speaker units may include a center channel speaker, a left channel speaker, and a right channel speaker.

According to an embodiment, the sound output device 100 may be implemented as a display device that provides content. According to an embodiment, the display device may be implemented as a television, but the disclosure is not limited thereto, and the display device may be any device with display capabilities, such as video wall, large format display (LFD), digital signage, digital information display (DID), projector display, or the like.

The display provided in the display device may be implemented in various forms, such as liquid crystal display (LCD), organic light-emitting diode (OLED), liquid crystal on silicon (LCoS), digital light processing (DLP), quantum dot (QD) display panel, quantum dot light-emitting diodes (QLED), etc.

Referring to FIG. 1, the sound output device 100 may be located in various spaces. For example, the sound output device 100 may be located in a particular space in a home, a particular space in an accommodation facility such as a hotel, a particular space in an office, etc.

According to an embodiment, the sound setting information of the sound output device 100 may be changed according to the user's settings, and the sound output device 100 with the changed sound setting information may output sound that reflects the user's tastes (or, preferences, etc.).

For example, the sound output device 100 may output sound with volume, left/right channel balance, reverb effector intensity, and equalizer corresponding to the user's settings. However, these are examples for convenience of explanation, and the specific description of sound setting information which can be changed according to the user's settings will be provided later.

Referring to FIG. 1, the sound output device 100 located in a particular space (first space) in a home outputs sound reflecting the user's tastes according to the user's settings, but another sound output device 100' located in a different space (second space) (e.g., a particular space in an accommodation facility) does not output sound reflecting the user's tastes because the sound setting information of the sound output device 100' has not been changed according to the user's settings. In order for the sound output device 100' to output sound reflecting the user's tastes, the user's settings are required, which causes inconvenience and hassle.

The sound output device 100 according to an embodiment may identify a user, and obtain perceived sound information corresponding to the identified user. Subsequently, the sound output device 100 may use the perceived sound information to obtain sound setting information for outputting sound reflecting the user's tastes, and may set the sound output device 100 according to the sound setting information. According to an embodiment, when a user is identified, the sound output device 100 may automatically obtain sound setting information for outputting sound reflecting the identified user's tastes, and set the sound output device 100 according to the sound setting information, so that sound reflecting the user's tastes can be output without requiring manual settings by the user.

Figure 2:
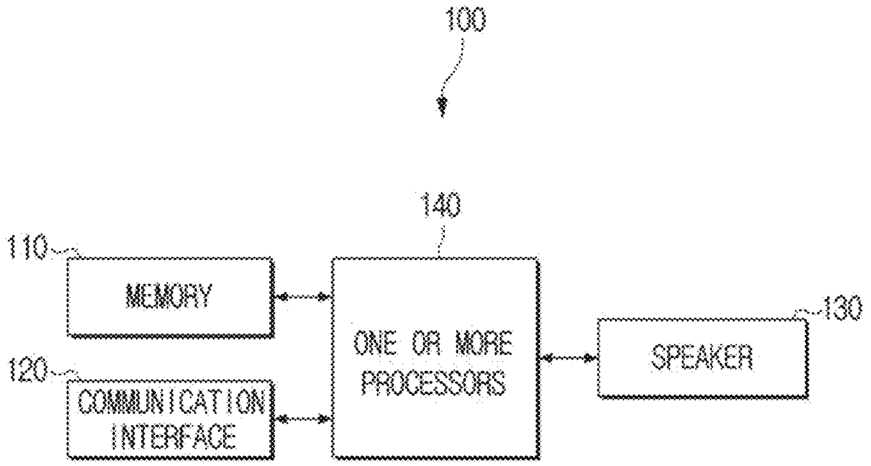
FIG. 2 is a block diagram provided to explain a configuration of a sound output device according to an embodiment.

FIG. 2 is a block diagram provided to explain a configuration of a sound output device according to an embodiment.

Referring to FIG. 2, the sound output device 100 may include a memory 110, a communication interface 120, a speaker 130, and one or more processors 140.

The memory 110 according to an embodiment may store data required for one or more embodiments of the present disclosure. The memory 110 may be implemented in the form of a memory embedded in the sound output device 100, or it may be implemented in the form of a memory removably attached to the sound output device 100, depending on the purpose of data storage.

For example, data for driving the sound output device 100 may be stored in the memory embedded in the sound output device 100, and data for the expansion function of the sound output device 100 may be stored in the memory detachable from the sound output device 100. The memory embedded in the sound output device 100 may be implemented as at least one of a volatile memory (e.g. a dynamic RAM (DRAM), a static RAM (SRAM), or a synchronous dynamic RAM (SDRAM)), a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g. a NAND flash or a NOR flash), a hard drive, or a solid state drive (SSD)). In addition, the memory detachable from the sound output device 100 may be implemented in the form of a memory card (e.g., a compact flash (CF), a secure digital (SD), a micro secure digital (Micro-SD), a mini secure digital (Mini-SD), an extreme digital (xD), or a multi-media card (MMC)), an external memory connectable to a USB port (e.g., a USB memory), or the like.

According to an embodiment, the memory 110 may store a computer program including at least one instruction or a set of instructions for controlling the sound output device 100.

The communication interface 120 provided in the sound output device 100 may perform communication with an external device, a server, etc. to receive various types of data and information. For example, the communication interface 120 may receive various types of data and information from an external device, an external storage medium (e.g., universal serial bus (USB) memory), an external server (e.g., web hard) or the like through a communication method such as an access point (AP)-based wireless fidelity (Wi-Fi, wireless local area network (LAN)), a Bluetooth, a Zigbee, a wired/wireless local area network (LAN), a wide area network (WAN), Ethernet, an IEEE 1394, a high definition multimedia interface (HDMI), a USB, a mobile high-definition link (MHL), audio engineering society/European broadcasting union (AES/EBU) communication, optical communication, coaxial communication, etc.

In particular, the communication interface 120 may transmit user identification information to a server under control of the one or more processors 140, and may receive perceived sound information corresponding to the user identification information from the server.

The speaker 130 provided in the sound output device 100 may output a sound signal. The speaker 130 may include at least one speaker unit (or audio amplifier).

According to an embodiment, the speaker 130 may be implemented as at least one full range speaker unit designed to output nearly the entire range of audible frequencies, or may be implemented as a speaker array including a plurality of speaker units for reproducing different frequency bands.

The one or more processors 140 according to an embodiment control the overall operations of the sound output device 100.

According to an embodiment, the one or more processors 140 may be implemented as a digital signal processor (DSP) for processing digital signals, a microprocessor, or a time controller (TCON), but is not limited thereto. The one or more processors 140 may include one or more of a central processing unit (CPU), a micro controller unit (MCU), a micro processing unit (MPU), a controller, an application processor (AP), a communication processor (CP), an ARM processor, or an Artificial Intelligence (AI) processor, or may be defined as the corresponding term. In addition, the one or more processors 140 may be implemented as a System on Chip (SoC) integrated with a processing algorithm, a large scale integration (LSI), or in the form of a field programmable gate array (FPGA). The one or more processors 140 may perform various functions by executing computer executable instructions stored in the memory.

The one or more processors 140 may include one or more of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The one or more processors 140 may control one or any combination of other components of the electronic device, and may perform operations related to communication or data processing. The one or more processors 140 may execute one or more programs or instructions stored in the memory. For example, the one or more processors 140 may perform a method according to an embodiment of the present disclosure by executing one or more instructions stored in the memory.

In a case where the method according to an embodiment of the disclosure includes a plurality of operations, the plurality of operations may be performed by one processor or by a plurality of processors. For example, in a case where a first operation, a second operation, and a third operation are performed by the method according to an embodiment, all of the first operation, the second operation, and the third operation may be performed by a first processor, or the first operation and the second operation may be performed by the first processor (e.g., a general-purpose processor) and the third operation may be performed by a second processor (e.g., an artificial intelligence-dedicated processor).

The one or more processors 140 may be implemented as a single-core processor including one core, or may be implemented as one or more multi-core processors including a plurality of cores (e.g., homogeneous multiple cores or heterogeneous multiple cores). In a case where the one or more processors 140 are implemented as multi-core processors, each of the plurality of cores included in the multi-core processors may include a processor internal memory such as a cache memory or an on-chip memory, and a common cache shared by the plurality of cores may be included in the multi core processors. In addition, each of the plurality of cores (or some of the plurality of cores) included in the multi-core processors may independently read and execute program instructions for implementing the method according to an embodiment, or all (or some) of the plurality of cores may be linked to each other to read and execute program instructions for implementing the method according to an embodiment.

In a case where the method according to an embodiment includes a plurality of operations, the plurality of operations may be performed by one of the plurality of cores included in the multi-core processors, or may be performed by the plurality of cores. For example, in a case where a first operation, a second operation, and a third operation are performed by the method according to an embodiment, all of the first operation, the second operation, and the third operation may be performed by a first core included in the multi-core processors, or the first operation and the second operation may be performed by the first core included in the multi-core processors, and the third operation may be performed by a second core included in the multi-core processors.

In embodiments of the disclosure, the processor may refer to a system on a chip (SoC) in which one or more processors and other electronic components are integrated, a single-core processor, multi-core processors, or a core included in the single-core processor or the multi-core processors. Here, the core may be implemented as CPU, GPU, APU, MIC, DSP, NPU, hardware accelerator, machine learning accelerator, or the like, but the embodiments of the disclosure are not limited thereto.

Firstly, when user identification information is received, the one or more processors 140 according to an embodiment may receive perceived sound information corresponding to the user identification information from the server through the communication interface 120.

The one or more processors 140 according to an embodiment may control the speaker 130 to output sound.

When a signal corresponding to the sound output by the speaker 130 is received from a remote control device 200 that received the sound, the one or more processors 140 according to an embodiment obtain sound setting information corresponding to the sound output device 100 by inputting first device information, the received signal and perceived sound information to a neural network model.

The one or more processors 140 according to an embodiment may set the sound output device 100 according to the sound setting information.

Figure 3:
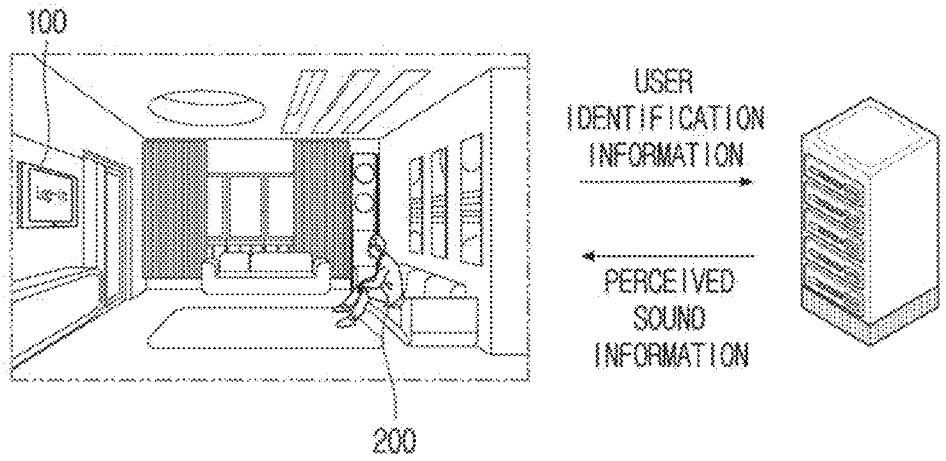
FIG. 3 is a view provided to explain a sound output device that transmits user identification information and receives perceived sound information according to an embodiment.

Detailed description thereof will be provided with reference to FIG. 3.

FIG. 3 is a view provided to explain a sound output device that transmits user identification information and receives perceived sound information according to an embodiment.

Referring to FIG. 3, the remote control device 200 may provide a UI for receiving user identification information (e.g., a user account). For example, the remote control device 200 may provide a login screen through a display, and may receive user identification information based on a user input to the login screen.

When the user identification information is received, the one or more processors 140 may transmit the user identification information to the server and receive perceived sound information corresponding to the user identification information from the server.

A server according to an embodiment may include the sound output device 100, an external device (e.g., another sound output device 100'), a communication module capable of performing communication with other servers, at least one processor capable of processing data received from the sound output device 100, the external device, and other servers, and at least one memory capable of storing programs for processing data or processed data. Such a server may be implemented as various computing devices, such as workstations, clouds, data drives, data stations, and the like. The server may be implemented as one or more servers that are physically or logically distinguished based on functions, detailed configuration of the functions, or data, which may perform communication with each other to send and receive data and process the data sent and received.

The server according to an embodiment may manage user identification information (e.g., a user account), and register perceived sound information in association with the user identification information.

In addition, the server may register device information (hereinafter, referred to as first device information) of the sound output device 100, device information (hereinafter, referred to as second device information) of an external device (e.g., another sound output device 100') in association with the user identification information, and may perform the function of managing or controlling each of the registered sound output device 100 and the sound output device 100'.

For example, a user may connect to the server through the sound output device 100 and create user identification information (e.g., a user account). The user identification information may include an ID and a password set by the user. Subsequently, when the first device information and the perceived sound information are received from the sound output device 100, the server may register the first device information and the perceived sound information in association with the user identification information.

Referring to FIG. 3, when the user identification information is received, the one or more processors 140 according to an embodiment may transmit the user identification information to the server. Subsequently, the one or more processors 140 may receive perceived sound information corresponding to the user identification information from the server.

The perceived sound information according to an embodiment may represent the user's preferred perceived auditory characteristics for sound output by an external device. Here, the external device may be another sound output device 100' that outputs sound reflecting the user's tastes based on the user's settings.

Returning to FIG. 2, the one or more processors 140 may control the speaker 130 to output sound. When a signal corresponding to sound is received from the remote control device 200 that has received the sound output by the speaker 130, the one or more processors 140 may obtain sound setting information corresponding to the sound output device 100 by inputting (i) the first device information, (ii) the received signal, and (iii) the perceived sound information received from the server to a neural network model.

Figure 4:
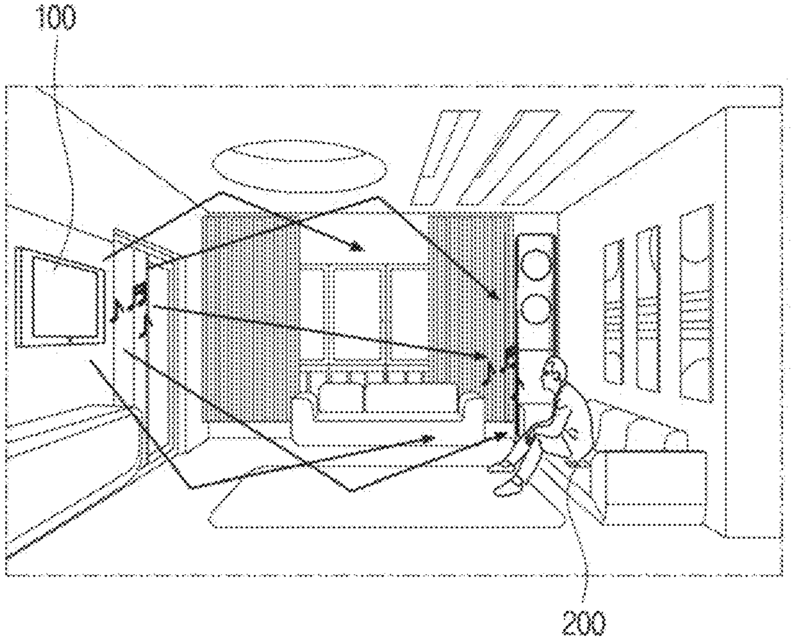
FIG. 4 is a view provided to explain a sound output device that outputs sound and a remote control device that transmits a signal according to an embodiment.

Detailed description thereof will be provided with reference to FIG. 4.

FIG. 4 is a view provided to explain a sound output device that outputs sound and the remote control device 200 that transmits a signal according to an embodiment.

According to an embodiment, it may be assumed that the sound output device 100 shown in FIG. 4 is the sound output device 100 that outputs sound reflecting the user's tastes by changing sound setting information according to the user's settings. For example, it may be assumed that the sound output device 100 illustrated in FIG. 4 is the sound output device 100 located in the user's home, which outputs sound reflecting the user's tastes according to the user's settings.

The sound output by the sound output device 100 may be modified (e.g., reflected, diffused, diffracted, resonated) in various ways depending on various objects (e.g., furniture, appliances) placed in the space where the sound output device 100 is located, the size of the space, the shape of the space, the sound reduction index of the space (e.g., sound insulation or sound absorption of the floor or walls constituting the space), and the like.

The sound output by the sound output device 100, of which sound setting information changed according to the user's settings, can be perceived auditorily by the user after being modified in various ways according to the characteristics of the space.

According to an embodiment, the remote control device 200 adjacent to the user may include a microphone, and the microphone may receive sound output by the sound output device 100. For example, since the microphone is adjacent to the user, the microphone may receive sound similar to sound that the user auditorily perceives, which is modified by the characteristics of the space.

According to an embodiment, the one or more processors 140 may receive a signal corresponding to the sound from the remote control device 200 that received the sound.

Subsequently, the one or more processors 140 may obtain perceived sound information based on the received signal.

For example, the one or more processors 140 may obtain perceived sound information including at least one of intensity of each of a plurality of frequencies, reverberation information of each of the plurality of frequencies, or perceived volume level by analyzing the received signal.

According to an embodiment, human audible frequencies range from 20 to 20,000 Hz, and depending on the characteristics of the human auditory system, the intensity of sound perceived by humans varies according to the frequency of the wave. The magnitude of sound auditorily perceived by humans is different from the physical intensity of the sound.

For example, even if sound has the same intensity (dB), the perceived magnitude may be different depending on the frequency (Hz) of the sound. For example, when comparing sounds of the same magnitude, mid-range sounds (around 1 kHz) are perceived as loudest, followed by high-pitched sounds (around 6-10 kHz) and then low-pitched sounds (under 100 Hz).

The perceived sound information may include a perceived volume level according to an equal loudness characteristic curve that plots the perceived characteristics in decibels and frequency bands.

Here, the perceived volume level may be obtained based on the energy of the signal received from the remote control device 200. For example, the one or more processors 140 may obtain the perceived volume level by applying a mean square of a preset time interval unit or a method as defined in ITU-R BS. 1770 to the received signal. According to an embodiment, the perceived volume level is a loudness value converted to a decibel scale. Here, the loudness refers to the loudness of sound reflecting human psychological characteristics (or as perceived by humans auditorily) rather than the physical intensity of the sound.

According to an embodiment, when obtaining the perceived sound information of the sound output device 100 that outputs sound reflecting the user's tastes according to the user's settings, the one or more processors 140 may transmit the obtained perceived sound information to the server.

The server according to an embodiment may register the perceived sound information in association with the user identification information.

According to an embodiment, it may be assumed that the sound output device 100 shown in FIG. 4 is the sound output device 100 that receives perceived sound information from the server, automatically sets the sound output device 100, and outputs sound that reflects the user's tastes without requiring manual settings by the user.

For example, it may be assumed that the sound output device 100 shown in FIG. 4 is the sound output device 100 located in a particular space in an accommodation facility such as a hotel, or a particular space in an office, or the like, where the sound setting information is not changed according to the user's settings, i.e., the sound output device 100 that does not output sound reflecting the user's tastes.

Firstly, when user identification information is received, the one or more processors 140 may receive perceived sound information corresponding to the user identification information from the server through the communication interface 120.

According to an embodiment, the one or more processors 140 may control the speaker 130 to output sound. The one or more processors 140 may receive a signal corresponding to the sound from the remote control device 200 that received the sound.

Figure 5:
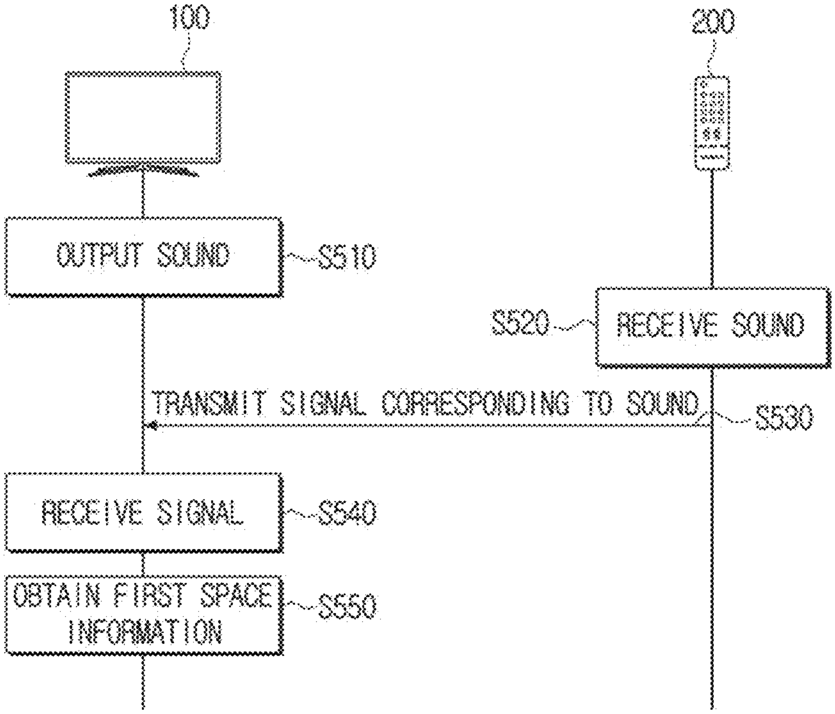
FIG. 5 is a sequence view provided to explain a sound output device that outputs sound, and an operation of a remote control device that transmits a signal, according to an embodiment.

Detailed description thereof will be provided with reference to FIG. 5.

FIG. 5 is a sequence view provided to explain a sound output device that outputs sound and an operation of the remote control device 200 that transmits a signal according to an embodiment.

Referring to FIG. 5, the one or more processors 140 may control the speaker 130 to output a first sound (S510).

Here, the first sound output by the sound output device 100 may be preset sound including a plurality of frequencies, for example a test sound, but the disclosure is not limited thereto.

For example, when the user identification information is received, the one or more processors 140 may identify sound corresponding to the user identification information among a plurality of sounds, and control the speaker 130 to output the identified sound.

For example, when the user identification information is received, the one or more processors 140 may control the speaker 130 to continuously output content that is currently being output. Here, the content may include sound content.

The remote control device 200 according to an embodiment may include a microphone, and the sound output by the speaker 130 may be received through the microphone (S520).

The remote control device 200 according to an embodiment may transmit a signal corresponding to the received first sound to the sound output device 100 (S530).

Here, the signal transmitted by the remote control device 200 to the sound output device 100 may correspond to the first sound that is modified in various ways depending on various objects (e.g., furniture, appliances) placed in the space where the sound output device 100 is located, the size of the space, the shape of the space, the sound reduction index of the space (e.g., sound insulation or sound absorption of the floor or walls constituting the space), the distance between the sound output device 100 and the remote control device 200, and the like.

According to an embodiment, the sound output device 100 may receive a signal from the remote control device 200 (S540), and obtain first space information including at least one of size information of the space where the sound output device 100 is located or shape information of the space (S550).

In addition, the sound output device 100 may obtain perceived characteristics according to the received signal by analyzing the signal received from the remote control device 200.

The sound output device 100 according to an embodiment may compare the perceived characteristics of the received signal with the perceived characteristics of the perceived sound information received from the server to obtain sound setting information for setting the sound output device 100 such that (i) the perceived characteristics of a second sound output by the sound output device 100 (generated based on the obtained sound setting information) and received by the remote control device 200 correspond to (ii) the perceived characteristics of the perceived sound information received from the server.

The one or more processors 140 according to an embodiment may obtain sound setting information corresponding to the sound output device 100 by inputting the signal received from the remote control device 200 in operation S540, the first device information corresponding to the sound output device 100, and the perceived sound information received from the server to a neural network model.

Here, the neural network model may be a model trained to identify sound setting information for the sound output device 100 corresponding to the first device information to output a second sound such that the perceived characteristics of the signal received from the remote control device 200 in response to the receipt of the second sound correspond to perceived characteristics according to the perceived sound information.

Figure 6:
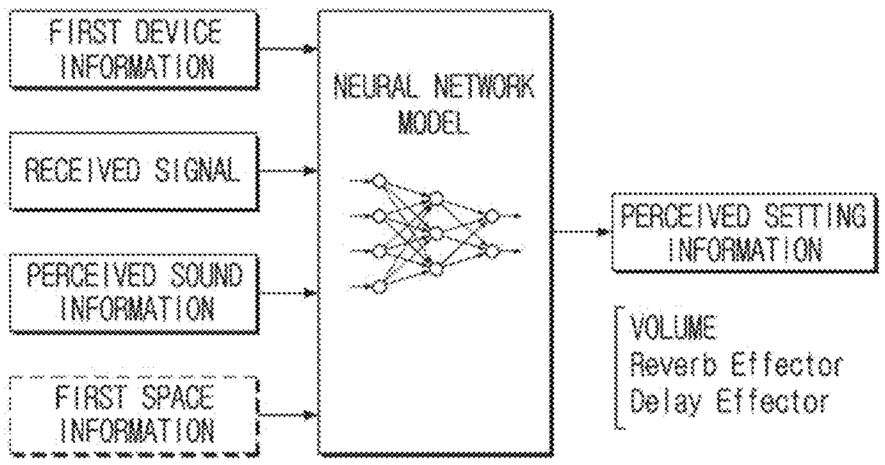
FIG. 6 is a view provided to explain a neural network model that identifies sound setting information according to an embodiment.

Detailed description thereof will be provided with reference to FIG. 6.

The remote control device 200 includes the remote control device 200 for controlling the sound output device 100, but this is only an example, and the remote control device 200 is not limited thereto.

For example, the sound output device 100 may receive a signal from a user terminal device capable of performing communication with the sound output device 100. Here, the user terminal device may include any form of electronic device that is capable of having a microphone, receiving sound output by the sound output device 100, and transmitting a signal corresponding to the received sound to the sound output device 100.

However, the present disclosure is not limited thereto, and the sound output device 100 may have a microphone therein, receive sound output by the sound output device 100 through the microphone provided in the sound output device, and obtain a signal corresponding to the received sound.

FIG. 6 is a view provided to explain a neural network model that identifies sound setting information according to an embodiment.

Referring to FIG. 6, the one or more processors 140 may obtain sound setting information corresponding to the sound output device 100 by inputting into a neural network model the first device information, the signal received from the remote control device 200, and the perceived sound information received from the server.

Here, the first device information may include a specification of the sound output device 100.

For example, the first device information may include frequency range, sensitivity, resistance (normal impedance [ohms]), maximum sound pressure (maximum SPL [dB]), recommended amplifier power [W], crossover frequency [Hz], volume curve, etc.

Here, the frequency range refers to the range of frequencies that can be output by the sound output device 100, and the sensitivity refers to the magnitude of the sound output by the speaker 120 when a preset voltage (e.g., 2.83 V) is applied to the speaker 120, which is the efficiency of the speaker 120.

The resistance is the value of the resistance of the coil within the speaker 120, and the magnitude of the resistance is inversely proportional to the output magnitude of the speaker 120.

The sound pressure is the intensity of sound, and the maximum sound pressure refers to the maximum sound pressure, i.e., the maximum output, which can be produced by the speaker 120.

The crossover frequency refers to the boundary of the divided sound range in a case where the entire audible frequency band is divided into two or more ways from low to high frequencies and a plurality of speakers share and reproduce each sound range since it is difficult to reproduce the entire audible frequency range with just one full speaker.

The volume curve is the amount of change in volume per step change in volume.

Here, the signal received from the remote control device 200 corresponds to sound (e.g., the first sound) that is variously modified (e.g., reflected, diffused, diffracted, resonated, etc.) based on characteristics of the space where the sound output device 100 is located (e.g., size of the space, shape of the space, etc.), and since the remote control device 200 is located adjacent to the user, the user's perceived characteristics of the sound output by the sound output device 100 and the perceived characteristics according to the received signal may be similar.

The perceived sound information received from the server may include, for example, the user's perceived characteristics of the sound output by a sound output device 100' which is located in the user's home and of which sound setting information has been changed according to the user's settings. Here, the sound output by the sound output device 100' is sound that reflects the user's tastes according to the user's settings.

The neural network model according to an embodiment may be a model trained to identify sound setting information for the sound output device 100 corresponding to the first device information to output sound (e.g., a second sound) such that the perceived characteristics of the signal received from the remote control device 200 in response to the second sound correspond to the perceived characteristics according to the perceived sound information.

According to an embodiment, the neural network model may be a model trained to identify sound setting information for changing the setting of the sound output device 100 such that, considering a specification of the sound output device 100 according to the first device information, (i) the perceived characteristics according to a signal of the remote control device 200 that received sound output by the sound output device 100 (e.g., the second sound) are the same or similar to (ii) the perceived characteristics according to the perceived sound information.

Accordingly, the perceived characteristics according to a signal of the remote control device 200 that received the second sound output by the sound output device 100 after the settings of the sound output device 100 have been changed according to the sound setting information identified from the neural network model may be the same or similar to the perceived characteristics according to the perceived sound information.

The sound setting information may include parameter information of at least one of a volume a sound mode, an equalizer, a woofer level, a reverb effector, a delay effector, or a channel balance for each of a plurality of speakers in the sound output device. According to an embodiment, the one or more processors 140 may set the sound output device 100 according to the sound setting information.

According to an embodiment, even if the volume of the sound output device 100 and the sound output device 100' is the same, the sound pressure of the sound output by the sound output device 100 and the sound pressure of the sound output by the sound output device 100' may be different.

According to an embodiment, the neural network model may identify a volume level for making the perceived characteristics of the sound output by the sound output device 100 corresponding to the first device information correspond to the perceived characteristics according to the perceived sound information. For example, although a specification of the sound output device 100' and a specification of the sound output device 100 are different, a perceived volume level for the sound output by the sound output device 100 of which volume has been changed according to the sound setting information obtained from the neural network model may be the same or similar to a perceived volume level for the sound output by the sound output device 100'.

According to an embodiment, the equalizer is an effector that changes frequency characteristics. For example, a particular frequency band may be boosted, or a particular frequency band may be cut. According to an embodiment, the neural network model may identify an equalizer for making the perceived characteristics of the sound output by the sound output device 100 corresponding to the first device information correspond to the perceived characteristics according to the perceived sound information.

According to an embodiment, the sound output device 100 may provide perceived characteristics same as or similar to the perceived characteristics of the sound output by the sound output device 100' by boosting or cutting a particular frequency band of the sound before outputting the same.

According to an embodiment, the reverb includes sound reflected from walls, floors, ceilings, or various objects within the space.

According to an embodiment, the neural network model may add artificial reverberation or reverb, through a reverb effector, to the sound output by the sound output device 100 corresponding to the first device information to make the perceived characteristics of the sound output by the sound output device 100 correspond to the perceived characteristics according to the perceived sound information.

According to an embodiment, an external device (e.g., sound output device 100') that transmitted the perceived sound information received by the sound output device 100 to the server may be located in a second space, and the sound output device 100 may be located in a first space, but the sound output device 100 may output sound with artificial reverberation or reverb added to provide a sense of space (e.g., hall, stage, room, etc.) according to the space characteristics of the second space.

According to an embodiment, the neural network model may reproduce the sound output by the sound output device 100 corresponding to the first device information again after a certain period of time has elapsed through a delay effector to provide an echo effect, thereby making the perceived characteristics of the sound output by the sound output device 100 correspond to the perceived characteristics according to the perceived sound information.

According to an embodiment, the external device (e.g., sound output device 100') that transmitted the perceived sound information received by the sound output device 100 to the server may be located in the second space, and the sound output device 100 may be located in the first space, but the sound output device 100 may output the sound again after a certain period of time has elapsed to provide an echo effect, thereby providing a sense of space according to the space characteristics of the second space.

The functions related to artificial intelligence according to the present disclosure are operated by the processor 140 and memory 110 of the sound output device 100.

The processor 140 may consist of one or a plurality of processors. The one or more processors may include at least one of a central processing unit (CPU), a graphics processing unit (GPU), or a neural processing unit (NPU), but are not limited to examples of the above-described processors.

The CPU is a generic-purpose processor which may perform not only general calculations but also artificial intelligence calculations, and may efficiently execute complex programs through a multi-layered cache structure. The CPU may be advantageous for a serial processing method that enables organic linkage between the previous calculation result and the next calculation result through sequential calculation. The generic-purpose processor is not limited to the above examples except for a case where the processor is specified as the above-mentioned CPU.

The GPU is a processor for large-scale operations such as floating-point operations used for graphics processing, and may perform the large-scale operations in parallel by integrating a large number of cores. In particular, the GPU may be advantageous for a parallel processing method such as a convolution operation or the like, compared to the CPU. In addition, the GPU may be used as a co-processor to supplement a function of the CPU. The processor for the large-scale operations is not limited to the above example except for a case where the processor is specified as the above-mentioned GPU.

The NPU is a processor specialized in artificial intelligence calculation using an artificial neural network, and each layer constituting the artificial neural network may be implemented as hardware (e.g., silicon). Here, the NPU is specially designed based on requirements of a company, and may thus have a lower degree of freedom than the CPU or the GPU. However, the NPU may efficiently process the artificial intelligence calculation required by the company. As the processor specialized for the artificial intelligence calculation, the NPU may be implemented in various forms such as a tensor processing unit (TPU), an intelligence processing unit (IPU), or a vision processing unit (VPU). The artificial intelligence processor is not limited to the above example except for a case where the processor is specified as the above-mentioned NPU.

In addition, one or more processors may be implemented as a system on chip (SoC). Here, the SoC may further include a memory and a network interface such as a bus for data communication between the processor and the memory in addition to the one or more processors.

In case that the system on chip (SoC) included in the sound output device 100 includes a plurality of processors, the sound output device 100 may use some of the plurality of processors to perform the artificial intelligence calculation (e.g., calculation related to the learning or inference of an artificial intelligence model). For example, the sound output device 100 may perform the artificial intelligence calculation by using at least one of the GPU, NPU, VPU, TPU, or a hardware accelerator that is specialized for the artificial intelligence calculation such as convolution calculation and matrix multiplication calculation among the plurality of processors. However, this is only an example, and the artificial intelligence calculation may be processed using a generic-purpose processor such as the CPU.

In addition, the sound output device 100 may perform calculation for a function related to the artificial intelligence by using multi-cores (e.g., dual-core or quad-core) included in one processor 140. In particular, the sound output device 100 may perform the artificial intelligence calculation such as the convolution calculation and the matrix multiplication calculation in parallel using the multi-cores included in the processor 140.

The one or more processors 140 may control to process the input data based on a predefined operation rule or artificial intelligence model stored in the memory 110. The predefined operation rule or artificial intelligence model may be acquired by the learning.

Here, "acquired by the learning" may indicate that the predefined operation rule or artificial intelligence model of a desired feature is acquired by applying a learning algorithm to a lot of learning data. Such learning may be performed on a device itself where the artificial intelligence is performed according to an embodiment, or by a separate server/system.

The artificial intelligence model may consist of a plurality of neural network layers. At least one layer has at least one weight value, and calculation of the layer may be performed through an operation result of a previous layer and at least one defined operation. Examples of the neural network may include a convolutional neural network (CNN), a deep neural network (DNN), a recurrent neural network (RNN), a restricted Boltzmann machine (RBM), a deep belief network (DBN), a bidirectional recurrent deep neural network (BRDNN), a deep Q-network, and a transformer. However, the neural network in this disclosure is not limited to the above examples except for a case where a type of the neural network is specified.

The learning algorithm is a method of training a predetermined target device (e.g., robot) by using a large number of learning data for the predetermined target device to make a decision or a prediction by itself. The learning algorithms may include, for example, a supervised learning algorithm, an unsupervised learning algorithm, a semi-supervised learning algorithm, or a reinforcement learning algorithm. However, the learning algorithm of the disclosure is not limited to the above-described examples, unless specified otherwise.

Returning to FIG. 5, the one or more processors 140 according to an embodiment may obtain first space information including at least one of size information of the space where the sound output device 100 is located or shape information of the space based on the signal received in operation S540 (S550).

For example, the one or more processors 140 may compare the sound output through the speaker 120 with the signal received from the remote control device 200 to obtain the first space information including at least one of size information of the space where the sound output device 100 is located or shape information of the space.

The one or more processors 140 according to an embodiment may obtain sound setting information by inputting the first device information, the first space information, the signal received from the remote control device 200, and the perceived sound information to a neural network model.

The sound output device 100 may analyze a signal received from the remote control device 200 to obtain perceived characteristics according to the received signal. Here, the perceived characteristics according to the received signal may correspond to the perceived characteristics according to the first space information of the sound output by the sound output device 100.

For example, the sound output by the sound output device 100 (e.g., the first sound) may be auditorily perceived by the user after being variously modified (e.g., reflected, diffused, diffracted, resonated) depending on various objects (e.g., furniture, appliances) placed in the first space where the sound output device 100 is located, the size of the space, the shape of the space, the sound reduction index of the space (e.g., sound insulation or sound absorption of the floor or walls constituting the space), and the like and thus, the perception characteristics according to the signal received from the remote control device 200 located adjacent to the user and the perception characteristics according to the first space information may be the same or similar.

The one or more processors 140 according to an embodiment may obtain first space information based on the received signal, and may obtain sound setting information corresponding to the sound output device 100 by inputting the first device information, the first space information, and the perceived sound information to a neural network model.

Figure 7:
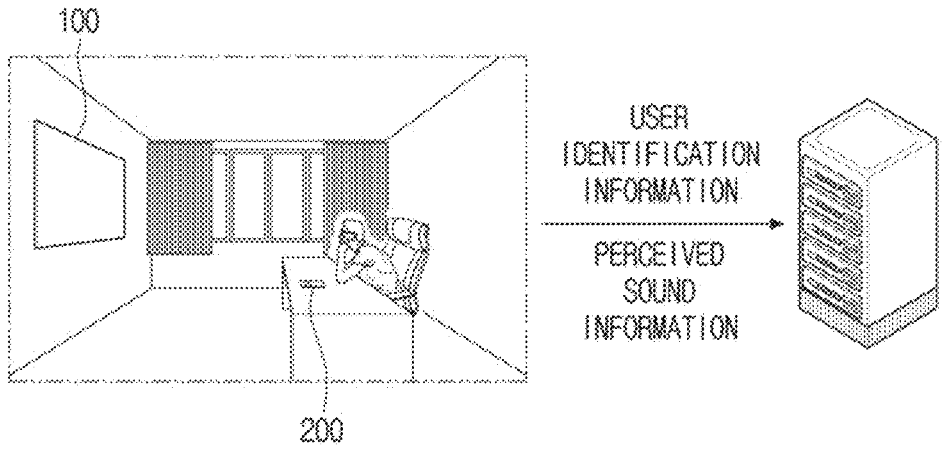
FIG. 7 is a view provided to explain a sound output device that transmits user identification information and perceived sound information according to an embodiment.

FIG. 7 is a view provided to explain a sound output device that transmits user identification information and perceived sound information according to an embodiment.

Referring to FIG. 7, the sound setting information of the sound output device 100 is changed according to the user's setting, and the sound output device 100 with the changed sound setting information may output sound reflecting the user's tastes.

For example, the sound output device 100 may output sound with volume, left/right channel balance, reverb effector intensity, and equalizer that corresponds to the user's settings.

The sound output device 100 may output sound according to the sound setting information which is manually changed in response to the user's setting, and when a signal corresponding to the sound is received from the remote control device 200, may obtain perceived sound information based on the perceived characteristics of the received sound.

For example, the sound output device 100 may analyze the received sound to obtain space information including at least one of size information or shape information of the space where the sound output device 100 is located, and obtain perceived sound information based on perceived characteristics according to the obtained space information.

Subsequently, the sound output device 100 may transmit the perceived sound information to the server to register the perceived sound information in association with the user identification information.

For example, the sound output device 100 may transmit the perceived sound information according to the settings of the initial setup phase (e.g., the out-of-box experience, OOBE phase) to the server and register the perceived sound information in association with the user identification information. However, this is only an example, and when a user command for obtaining perceived sound information according to the current setting of the sound output device 100 and transmitting the same to the server is received, the perceived sound information may be transmitted to the server and the perceived sound information may be registered in association with the user identification information.

In addition, when the output of sound is detected for more than a preset time according to the current setting, the sound output device 100 may identify the sound output according to the current setting as sound reflecting the user's tastes, and obtain and transmit the perceived sound information according to the current setting to the server.

Hereinafter, for convenience of explanation, it is assumed that the sound output device 100 that transmits the perceived sound information to the server and registers the perceived sound information in association with the user identification information is an external device, the device information corresponding to the external device is second device information, and the space information corresponding to the space where the external device is located is second space information.

The one or more processors 140 according to an embodiment may receive perceived sound information corresponding to user identification information, and the perceived sound information corresponding to the user identification information may include perceived characteristics according to the second device information and the information of the second space where the external device corresponding to the second device information is located.

When the first device information and the second device information are different, the one or more processors 140 according to an embodiment may obtain sound setting information by inputting the first device information, the received signal, and the perceived sound information to a neural network model.

For example, when the first device information and the second device information are different, the sound output device 100 and the external device each have different specifications. Thus, in order to output sound that reflects the user's tastes, the sound setting information should be obtained by inputting the first device information, the received signal, and the perceived sound information to a neural network model, and the sound output device 100 should be set according to the obtained sound setting information.

When the first device information and the second device information are the same, the one or more processors 140 may compare the first space information where the sound output device 100 is located with the second space information.

Subsequently, when the first space information and the second space information are different, the one or more processors 140 may obtain sound setting information corresponding to the sound output device 100 by inputting the first device information, the received signal, and the perceived sound information to a neural network model.

For example, when the first device information and the second device information are the same, the sound output device 100 and the external device may have the same specifications. However, when the first space where the sound output device 100 is located and the second space where the external device is located are different, in order to output sound that reflects the user's tastes, the sound setting information should be obtained by inputting the first device information, the received signal, and the perceived sound information to a neural network model, and the sound output device 100 should be set according to the obtained sound setting information.

Since the perceived characteristics according to the first space information are the same or similar to the perceived characteristics according to the received signal, the one or more processors 140 may also obtain the first space information based on the received signal and further input the same to the neural network model.

Figure 8:
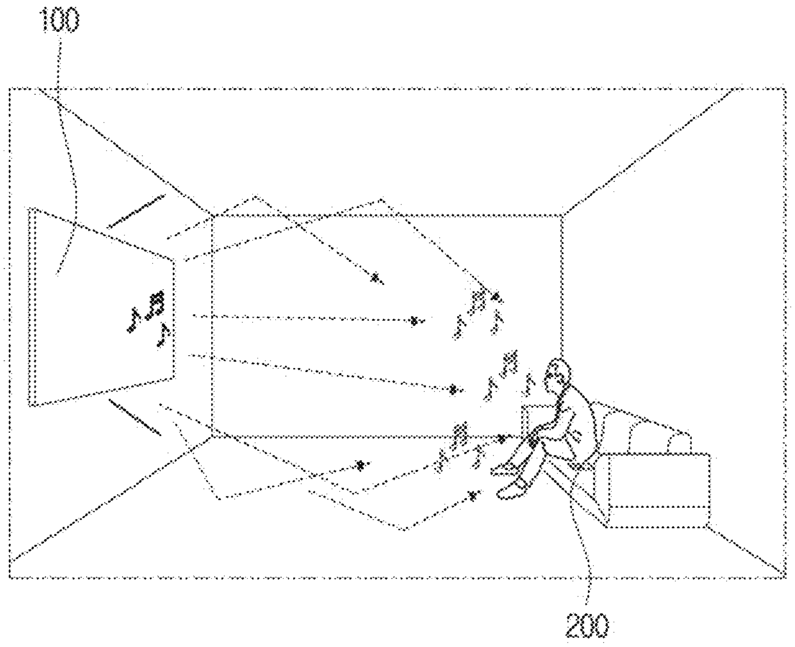
FIG. 8 is a view provided to explain perceived characteristics corresponding to device information and space information according to an embodiment.

FIG. 8 is a view provided to explain perceived characteristics corresponding to device information and space information according to an embodiment.

Referring to FIG. 8, the sound output by the sound output device 100 may be variously modified (e.g., reflected, diffused, diffracted, resonated) depending on various objects (e.g., furniture, appliances) placed in the space where the sound output device 100 is located, the size of the space, the shape of the space, the sound reduction index of the space (e.g., sound insulation or sound absorption of the floor or walls constituting the space), and the like. The sound output by the sound output device 100 of which sound setting information has been changed according to the user's settings, may be auditorily perceived by the user after being modified variously according to the characteristics of the space.

Figure 9:
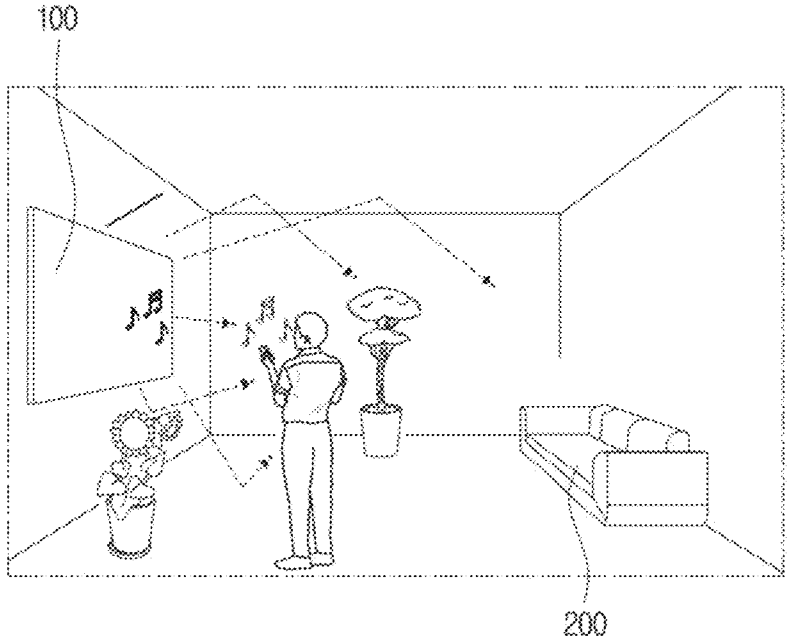
FIG. 9 is a view provided to explain perceived characteristics corresponding to device information and space information according to an embodiment.

FIG. 9 is a view provided to explain perceived characteristics corresponding to device information and space information according to an embodiment.

Comparing FIGS. 8 and 9, the sound output by the sound output device 100 may be auditorily perceived by the user after being modified variously depending on the distance between the sound output device 100 and the user, objects placed in the space where the sound output device 100 is located, and the like.

For example, the intensity of the sound is inversely proportional to the square of the distance between the sound output device 100 and the user (e.g., remote control device 200).

Accordingly, when the user who has gripped the remote control device 200 moves close to the sound output device 100, the intensity of the sound output by the sound output device 100 should decrease so as for the user to auditorily perceive the sound in the same (unchanged) manner.

The one or more processors 140 according to an embodiment may obtain distance information between the sound output device 100 and the remote control device 200 based on the signal received from the remote control device 200.

For example, the one or more processors 140 may receive a signal from the remote control device 200 at preset time intervals to update the distance information between the sound output device 100 and the remote control device 200.

When the distance information between the sound output device 100 and the remote control device 200 changes, the one or more processors 140 may re-output the sound, and when a signal corresponding to the re-output sound is re-received from the remote control device 200 receiving the re-output sound, the first device information, the re-received signal, and the perceived sound information may be input to the neural network model to reobtain the sound setting information.

Subsequently, the one or more processors 140 may set the sound output device 100 according to the re-obtained sound setting information.

For example, when the distance information between the sound output device 100 and the remote control device 200 decreases, the one or more processors 140 may decrease the volume of the sound output device 100 according to the re-obtained sound setting information.

For example, when the distance information between the sound output device 100 and the remote control device 200 increases, the one or more processors 140 may increase the volume of the sound output device 100 according to the re-obtained sound setting information.

The one or more processors 140 according to an embodiment may identify a noise reduction index (e.g., sound insulation or sound absorption, etc.) caused by objects placed in the space where the sound output device 100 is located based on the signal received from the remote control device 200.

For example, when an increase in the noise reduction index is identified due to an increase in the number of objects placed between the sound output device 100 and the remote control device 200 based on the signal received from the remote control device 200, the one or more processors 140 may re-output the sound, and when a signal corresponding to the re-output sound is received again from the remote control device 200 that received the re-output sound, the first device information, the re-received signal, and the perceived sound information may be input to a neural network model to re-obtain the sound setting information.

For example, when the noise reduction index decreases due to a decrease in the number of objects placed between the sound output device 100 and the remote control device 200, the one or more processors 140 may reduce the volume of the sound output device 100 according to the re-obtained sound setting information.

For example, when the noise reduction index increases due to an increase in the number of objects placed between the sound output device 100 and the remote control device 200, the one or more processors 140 may increase the volume of the sound output device 100 according to the re-obtained sound setting information.

Figure 10:
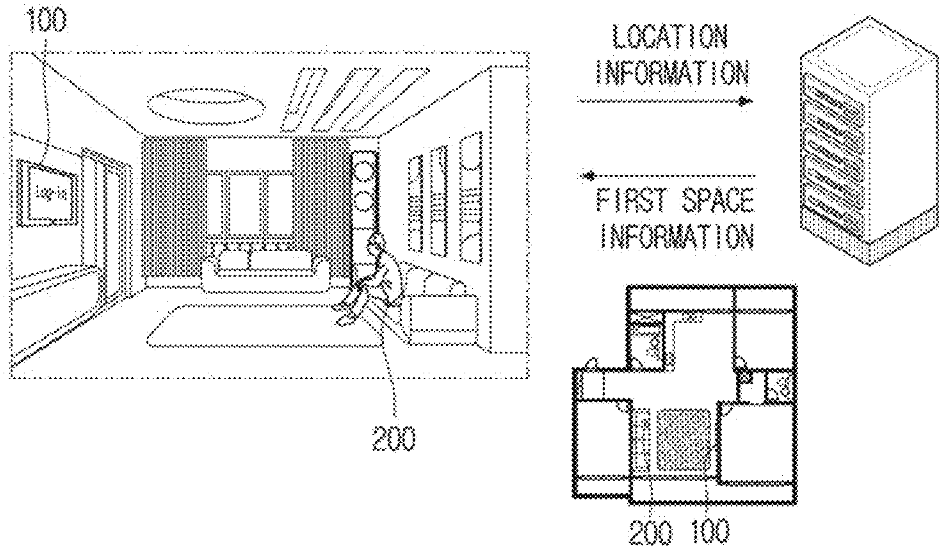
FIG. 10 is a view provided to explain a sound output device that receives space information according to an embodiment.

FIG. 10 is a view provided to explain a sound output device that receives space information according to an embodiment.

Referring to FIG. 10, the one or more processors 140 may transmit location information where the sound output device 100 is located to a server and receive first space information from the server.

For example, the server may store a floor plan corresponding to the location information, and when the location information is received from the sound output device 100, the server may transmit the floor plan to the sound output device.

According to an embodiment, when the server is unable to specify a floor plan corresponding to the location information received from the sound output device 100, the server may transmit a group of floor plan candidates with a preset reliability to the sound output device 100.

According to an embodiment, the sound output device 100 receiving the group of floor plan candidates may sequentially display a first floor plan, a second floor plan, and the like included in the group of floor plan candidates on a display, and when one of the floor plans is selected in response to a user input, the first space information may be obtained based on the selected floor plan.

According to an embodiment, when the selected floor plan includes a plurality of spaces, a user input for selecting any one of the plurality of spaces may be received, and the first space information corresponding to the space where the sound output device 100 is located may be obtained based on the received user input.

Here, the first space information may include at least one of the size of the space where the sound output device 100 is located, the shape of the space, or the noise reduction index of the space.

The perceived characteristics according to the signal received from the remote control device 200 and the perceived characteristics according to the first space information may be the same or similar, and the one or more processors 140 according to an embodiment may obtain sound setting information by inputting the first device information, the first space information, and the perceived sound information received from the server to a neural network model.

Figure 11:
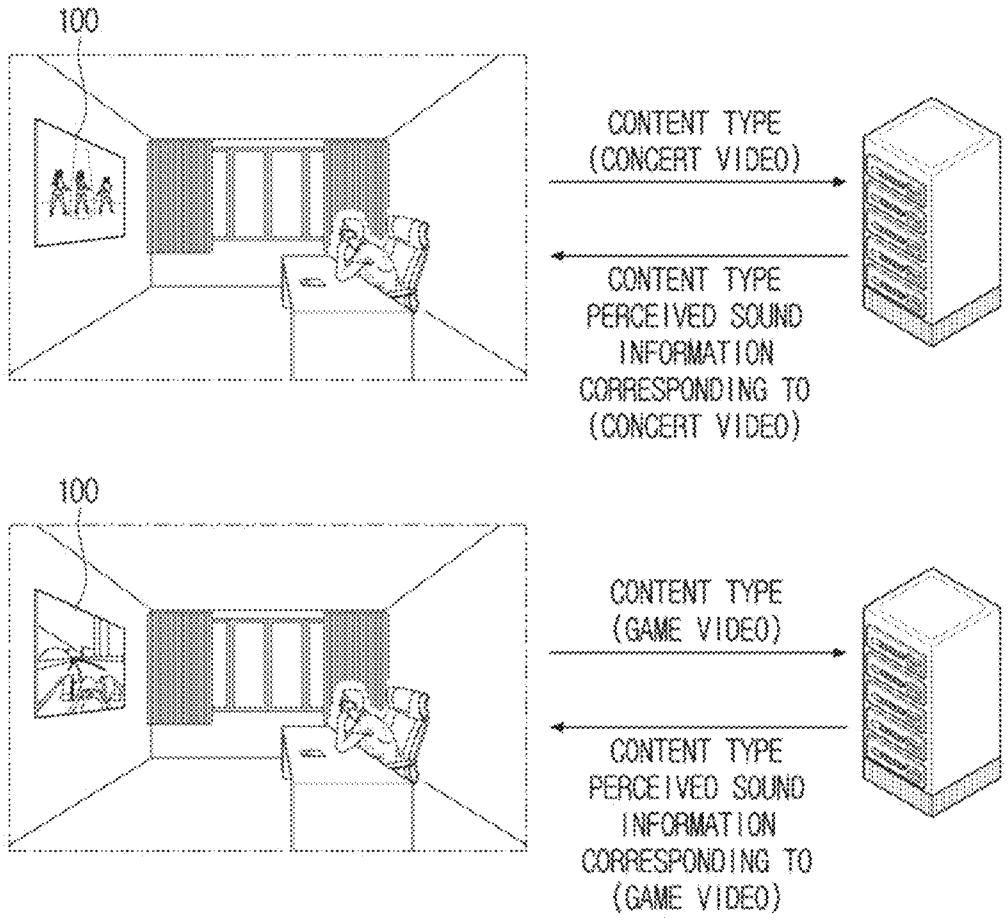
FIG. 11 is a view provided to explain a sound output device that receives perceived sound information corresponding to a content type according to an embodiment.

FIG. 11 is a view provided to explain a sound output device that receives perceived sound information corresponding to a content type according to an embodiment.

Referring to FIG. 11, the server may store the perceived sound information in association with the user identification information by content type. For example, the server may store perceived sound information corresponding to each of movie content, game content, concert content, streaming content, or image content.

When the user identification information is received, the sound output device 100 may identify the content type of the content that is being displayed or output, and transmit the user identification information and the identified content type to the server.

According to an embodiment, the server may identify perceived sound information corresponding to the received content type from the perceived sound information corresponding to the received user identification information. Subsequently, the server may transmit the identified perceived sound information to the sound output device 100.

Subsequently, the sound output device 100 may obtain sound setting information corresponding to the sound output device 100 by inputting the first device information, the signal received from the remote control device 200, and the perceived sound information corresponding to the content type to a neural network model.

Although FIG. 11 illustrates only concert content and game content for convenience of explanation, the present disclosure is not limited thereto, and the server may store perceived sound information corresponding to each of the various content types.

In addition, when the identified content type does not require sound output, such as image content, the sound output device 100 may operate in a standby mode (or an efficiency enhancement mode) in which power supply to the sound is blocked.

Figure 12:
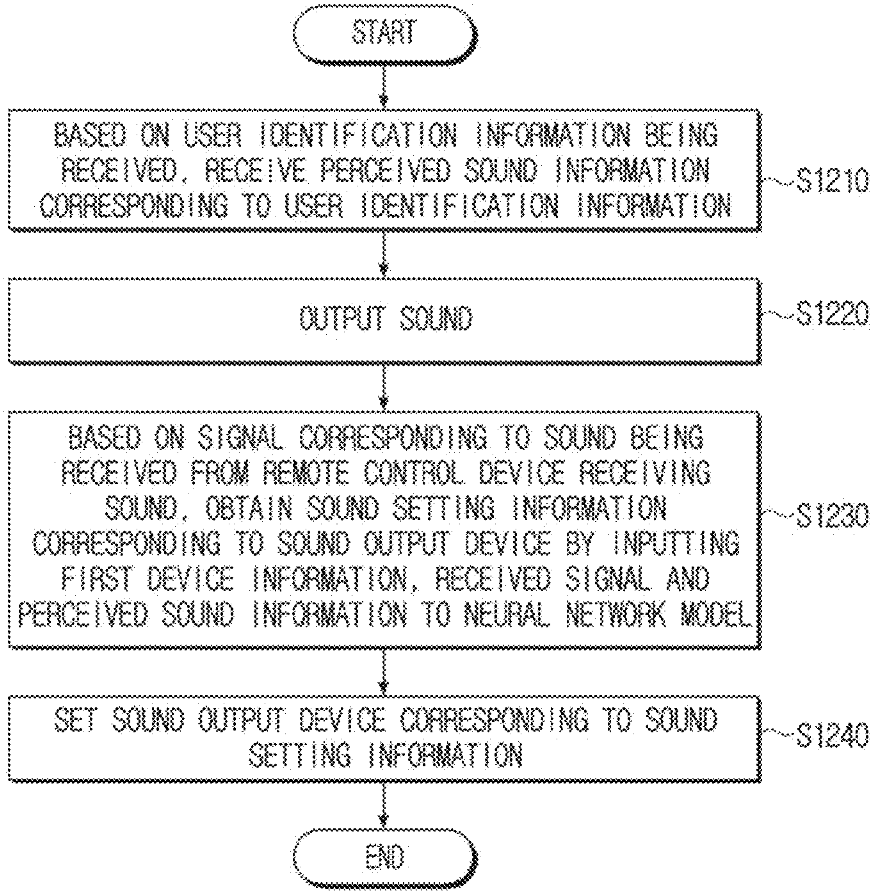
FIG. 12 is a flowchart provided to explain a controlling method of a sound output device according to an embodiment.

FIG. 12 is a flowchart provided to explain a controlling method of a sound output device according to an embodiment.

A controlling method of a sound output device according to an embodiment includes, when user identification information is received, receiving perceived sound information corresponding to the user identification information from a server (S1210).

Subsequently, sound is output (S1220).

Then, when a signal corresponding to the sound is received from a remote control device that received the sound, first device information, the received signal, and perceived sound information are input to a neural network model to obtain sound setting information corresponding to the sound output device (S1230).

Next, the sound output device is set according to the sound setting information (S1240).

Here, the neural network model is a model trained to identify sound setting information for a sound output device corresponding to the first device information to output sound such that the perceived characteristics of the signal received from the remote control device correspond to the perceived characteristics according to the perceived sound information.

The controlling method according to an embodiment may further include obtaining first space information including at least one of size information of a space where the sound output device is located or shape information of the space based on the signal received from the remote control device, and operation S1230 of obtaining sound setting information includes obtaining the sound setting information by inputting the first device information, the first space information, the received signal, and the perceived sound information to a neural network model, and the perceived characteristics of the received signal may correspond to the perceived characteristics according to the first space information of the sound output by the sound output device.

The perceived sound information corresponding to the user identification information according to an embodiment may include second device information, second space information of a space where an external device corresponding to the second device information is located, and perceived characteristics according to the second space information of sound output from the external device, and operation S1230 of obtaining the sound setting information may include, when the first device information and the second device information are different, inputting the first device information, the first space information, the received signal, and the perceived sound information to a neural network model to obtain the sound setting information.

Operation S1230 of obtaining the sound setting information according to an embodiment may include, when the first device information and the second device information are the same, comparing the first space information where the sound output device is located with the second space information, and when the first device information and the second space information are different, inputting the first device information, the first space information, the received signal, and the perceived sound information to a neural network model to obtain the sound setting information corresponding to the sound output device.

The controlling method according to an embodiment may further include obtaining distance information between the sound output device and the remote control device based on the received signal, when the distance information changes, re-outputting the sound, and when a signal corresponding to the re-outputted sound is received again from the remote control device receiving the re-outputted sound, inputting the first device information, the re-received signal, and the perceived sound information to a neural network model to re-obtain the sound setting information.

The controlling method according to an embodiment may further include, when the user identification information is received, identifying test sound corresponding to the user identification information, operation S1220 of outputting the sound may include outputting the test sound, and operation S1230 of obtaining the sound setting information may include, when a signal corresponding to the test sound is received from the remote control device that received the test sound, inputting the first device information, the received signal, and the perceived sound information to a neural network model to obtain the sound setting information.

The controlling method according to an embodiment may further include, when the setting of the sound output device is changed in response to a user input, outputting sound according to the changed setting, when a signal corresponding to the sound is received from the remote control device, obtaining perceived sound information corresponding to user identification information of the user based on the perceived characteristics of the received signal, and transmitting the perceived sound information to a server.

Operation S1230 of obtaining the sound setting information according to an embodiment may include, when first space information including at least one of size information of the space where the sound output device is located or shape information of the space is received, inputting the first device information, the first space information, the received signal, and the perceived sound information to a neural network model to obtain the sound setting information.

The controlling method according to an embodiment may further include identifying a content type corresponding to sound output by the sound output device, operation S1210 of receiving the sound setting information may include receiving perceived sound information corresponding to the identified content type among perceived sound information for each of a plurality of content types, and operation S1230 of obtaining the sound setting information may include inputting the first device information, the received signal, and the perceived sound information to a neural network model to obtain the sound setting information.

The perceived characteristic according to the perceived sound information according to an embodiment may include at least one of the intensity of each of a plurality of frequencies, reverberation information of each of the plurality of frequencies, or a perceived volume level.

According to an embodiment, the sound setting information may include parameter information for at least one of a volume, a sound mode, an equalizer, a woofer level, a reverb effector, a delay effector, or a channel balance for each of a plurality of speakers in the sound output device.

However, various embodiments of the present disclosure can be applied to various types of electronic devices having speakers as well as sound output devices.

The above-described various embodiments are may be implemented in a recording medium that can be read by a computer or a similar device using software, hardware, or a combination thereof. In some cases, embodiments described herein may be implemented by a processor itself. According to software implementation, embodiments such as procedures and functions described in this specification may be implemented as separate software modules. Each the software modules may perform one or more functions and operations described herein.

Computer instructions for performing processing operations of the sound output device 100 according to the above-described various embodiments may be stored in a non-transitory computer-readable medium. When being executed by a processor of a specific device, the computer instructions stored in such a non-transitory computer-readable medium allows the specific device to perform processing operations in the sound output device 100 according to the above-described various embodiments.

The non-transitory computer-readable medium refers to a medium that stores data semi-permanently and can be read by a device, rather than a medium that stores data for a short period of time, such as registers, caches, and memories. Specific examples of the non-transitory computer-readable medium may include CD, DVD, hard disk, Blu-ray disk, USB, memory card, ROM, etc.

Although embodiments of the present disclosure have been shown and described above, the disclosure is not limited to the specific embodiments described above, and various modifications may be made by one of ordinary skill in the art without departing from the spirit of the disclosure as claimed in the claims, and such modifications are not to be understood in isolation from the technical ideas or prospect of the disclosure.

What is claimed is:

1. A sound output device comprising:

at least one memory storing one or more instructions and first device information of the sound output device;

a communication interface comprising circuitry;

a speaker; and one or more processors configured to:

based on receiving user identification information, receive perceived sound information corresponding to the user identification information from a server through the communication interface;

control the speaker to output a first sound;

based on receiving a signal corresponding to the first sound from a remote control device, obtain sound setting information corresponding to the sound output device by inputting into a neural network model the first device information, the signal corresponding to the first sound, and the perceived sound information;

set the sound output device according to the sound setting information; and control the speaker to output a second sound after the sound output device is set according to the sound setting information, wherein the sound setting information is an output of the neural network model, and wherein a signal corresponding to the second sound received from the remote control device comprises perceived characteristics which correspond to perceived characteristics according to the perceived sound information.

2. The sound output device of claim 1, wherein the one or more processors are configured to:

obtain, based on the signal corresponding to the first sound, first space information comprising at least one of size information of a space where the sound output device is located or shape information of the space, and obtain the sound setting information by inputting, into the neural network model, the first device information, the first space information, the signal corresponding to the first sound, and the perceived sound information, and wherein perceived characteristics of the first space information correspond to perceived characteristics of the signal corresponding to the first sound.

3. The sound output device of claim 1, wherein the perceived sound information comprises second device information, second space information of a space where an external device corresponding to the second device information is located, and perceived characteristics corresponding to the second space information of a sound output from the external device, and wherein the one or more processors are configured to:

obtain, based on the signal corresponding to the first sound, first space information comprising at least one of size information of a space where the sound output device is located or shape information of the space, and based on the first device information and the second device information being different, obtain the sound setting information by inputting into the neural network model the first device information, the first space information, the signal corresponding to the first sound, and the perceived sound information.

4. The sound output device of claim 3, wherein the one or more processors are configured to:

based on the first device information and the second device information being the same, compare the first space information with the second space information, and based on the first space information and the second space information being different, obtain the sound setting information by inputting into the neural network model the first device information, the first space information, the signal corresponding to the first sound, and the perceived sound information.

5. The sound output device of claim 1, wherein the one or more processors are configured to:

obtain, based on the signal corresponding to the first sound, distance information comprising a distance between the sound output device and the remote control device, based on the distance information being changed, control the speaker to re-output the first sound, and based on a signal corresponding to the re-output first sound being received from the remote control device receiving, re-obtain the sound setting information by inputting into the neural network model the first device information, the signal corresponding to the re-output first sound, and the perceived sound information.

6. The sound output device of claim 1, wherein the one or more processors are configured to:

based on receiving the user identification information, identify a test sound corresponding to the user identification information, and control the speaker to output the test sound as the first sound.

7. The sound output device of claim 1, wherein the one or more processors are configured to:

based on a setting of the sound output device being changed in response to a user input, re-output the first sound according to the changed setting;

based on receiving a signal corresponding to the re-output first sound from the remote control device, obtain updated perceived sound information corresponding to the user identification information based on the perceived characteristics of the signal corresponding to the re-output first sound; and control the communication interface to transmit the updated perceived sound information to the server.

8. The sound output device of claim 1, wherein the one or more processors are configured to, based on receiving, through the communication interface, first space information comprising size information of a space where the sound output device is located or shape information of the space being received through the communication interface, obtain the sound setting information by inputting the first device information, the first space information, the signal corresponding to the first sound, and the perceived sound information to the neural network model.

9. The sound output device of claim 1, wherein the one or more processors are configured to:

identify a content type corresponding to the first sound;

receive perceived sound information corresponding to the identified content type among perceived sound information for each of a plurality of content types; and obtain the sound setting information by inputting into the neural network model the first device information, the signal corresponding to the first sound, and the perceived sound information corresponding to the identified content type.

10. The sound output device of claim 1, wherein the perceived characteristics according to the perceived sound information comprise at least one of an intensity of each of a plurality of frequencies, reverberation information of each of the plurality of frequencies, or a perceived sound level.

11. The sound output device of claim 1, wherein the sound setting information comprises parameter information of at least one of a volume, a sound mode, an equalizer, a woofer level, a reverb effector, a delay effector, or a channel balance for each of a plurality of speakers provided in the sound output device.

12. A method of controlling a sound output device, the method comprising:

based on receiving user identification information, receiving from a server perceived sound information corresponding to the user identification information;

outputting a first sound;

based on receiving a signal corresponding to the first sound from a remote control device, obtaining sound setting information corresponding to the sound output device by inputting into a neural network model first device information stored in a memory of the sound output device, the signal corresponding to the first sound, and the perceived sound information;

setting the sound output device according to the sound setting information, and outputting a second sound after the sound output device is set according to the sound setting information, wherein the sound setting information is an output of the neural network model, and wherein a signal corresponding to the second sound received from the remote control device comprises perceived characteristics which correspond to perceived characteristics according to the perceived sound information.

13. The method of claim 12, further comprising:

obtaining, based on the signal corresponding to the first sound, first space information comprising at least one of size information of a space where the sound output device is located or shape information of the space, wherein the obtaining the sound setting information further comprises obtaining the sound setting information by inputting into the neural network model the first device information, the first space information, the signal corresponding to the first sound, and the perceived sound information, and wherein perceived characteristics of the first space information correspond to perceived characteristics of the signal corresponding to the first sound.

14. The method of claim 12, further comprising:

obtaining, based on the signal corresponding to the first sound, first space information comprising at least one of size information of a space where the sound output device is located or shape information of the space, wherein the perceived sound information comprises second device information, second space information of a space where an external device corresponding to the second device information is located, and perceived characteristics corresponding to the second space information of a sound output from the external device, and wherein the obtaining the sound setting information further comprises, based on the first device information and the second device information being different, obtaining the sound setting information by inputting into the neural network model the first device information, the first space information, the signal corresponding to the first sound, and the perceived sound information.

15. The method of claim 14, wherein the obtaining the sound setting information further comprises:

based on the first device information and the second device information being the same, comparing the first space information with the second space information; and based on the first space information and the second space information being different, obtaining the sound setting information by inputting into the neural network model the first device information, the first space information, the signal corresponding to the first sound, and the perceived sound information.

16. A sound output system comprising:

a remote control device comprising a microphone; and a sound output device comprising:

at least one memory storing one or more instructions and first device information of the sound output device;

a communication interface comprising circuitry;

a speaker; and one or more processors configured to:

based on receiving user identification information, receive perceived sound information corresponding to the user identification information from a server through the communication interface;

control the speaker to output a first sound;

based on receiving a signal corresponding to the first sound from the remote control device, obtain sound setting information corresponding to the sound output device by inputting into a neural network model the first device information, the signal corresponding to the first sound, and the perceived sound information;

set the sound output device according to the sound setting information; and control the speaker to output a second sound after the sound output device is set according to the sound setting information, wherein the sound setting information is an output of the neural network model, and wherein a signal corresponding to the second sound received from the remote control device comprises perceived characteristics which correspond to perceived characteristics according to the perceived sound information.

17. The sound output system of claim 16, wherein the one or more processors are configured to:

obtain, based on the signal corresponding to the first sound, first space information comprising at least one of size information of a space where the sound output device is located or shape information of the space, and obtain the sound setting information by inputting, into the neural network model, the first device information, the first space information, the signal corresponding to the first sound, and the perceived sound information, and wherein perceived characteristics of the first space information correspond to perceived characteristics of the signal corresponding to the first sound.

18. The sound output device of claim 16, wherein the perceived sound information comprises second device information, second space information of a space where an external device corresponding to the second device information is located, and perceived characteristics corresponding to the second space information of a sound output from the external device, and wherein the one or more processors are configured to:

obtain, based on the signal corresponding to the first sound, first space information comprising at least one of size information of a space where the sound output device is located or shape information of the space, and based on the first device information and the second device information being different, obtain the sound setting information by inputting into the neural network model the first device information, the first space information, the signal corresponding to the first sound, and the perceived sound information.

19. The sound output device of claim 18, wherein the one or more processors are configured to:

based on the first device information and the second device information being the same, compare the first space information with the second space information, and based on the first space information and the second space information being different, obtain the sound setting information by inputting into the neural network model the first device information, the first space information, the signal corresponding to the first sound, and the perceived sound information.

20. The sound output device of claim 16, wherein the one or more processors are configured to:

obtain, based on the signal corresponding to the first sound, distance information comprising a distance between the sound output device and the remote control device, based on the distance information being changed, control the speaker to re-output the first sound, and based on a signal corresponding to the re-output first sound being received from the remote control device receiving, re-obtain the sound setting information by inputting into the neural network model the first device information, the signal corresponding to the re-output first sound, and the perceived sound information.

* * * * *